US009292543B2

(12) United States Patent
Kanevsky et al.

(10) Patent No.: US 9,292,543 B2
(45) Date of Patent: Mar. 22, 2016

(54) REAL TIME BACKUP SYSTEM FOR COMPUTER USERS

(71) Applicant: International Business Machines Corporation, Armonk, NY (US)

(72) Inventors: Dimitri Kanevsky, Ossining, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 13/863,045

(22) Filed: Apr. 15, 2013

(65) Prior Publication Data

US 2013/0238560 A1 Sep. 12, 2013

Related U.S. Application Data

(60) Continuation of application No. 13/085,106, filed on Apr. 12, 2011, now Pat. No. 8,423,510, which is a division of application No. 12/124,750, filed on May 21, 2008, now Pat. No. 7,991,739, which is a (Continued)

(51) Int. Cl.
*G06F 17/00* (2006.01)
*G06F 17/30* (2006.01)
(Continued)

(52) U.S. Cl.
CPC ...... *G06F 17/30289* (2013.01); *G06F 11/1446* (2013.01); *G06F 11/1456* (2013.01); *G06F 11/1458* (2013.01); *G06F 11/1464* (2013.01); *G06F 11/3438* (2013.01); *Y10S 707/99955* (2013.01)

(58) Field of Classification Search
CPC .................................................. G06F 11/3438

USPC ......... 707/611, 618, 620, 626, 634, 640, 610, 707/661, 674, 675, 678, 683, 684, 707/999.202–204; 714/6, 25; 380/283; 382/181
See application file for complete search history.

(56) References Cited

U.S. PATENT DOCUMENTS 5,136,642 A 8/1992 Kawamura et al.
5,257,366 A 10/1993 Adair et al.
(Continued)

*Primary Examiner* — Syling Yen
(74) *Attorney, Agent, or Firm* — Scully, Scott, Murphy & Presser, P.C.; Daniel P. Morris, Esq.

(57) ABSTRACT

This invention involves tracking and backing all the information that a user generates on its computer devices (including embedded devices) in real time. The local user server records all user actions and gestures (via various means that include TV cameras). All of this information (user actions and saved files in a computer) is then sent to a remote server via the Internet. This remote server has a virtual map of all the embedded devices on a computer that the person uses. The remote server immediately starts to interpret the user's actions (including user gestures). In one implementation, the invention stores user actions that are related to data generation (e.g. actions that called some links where data is stored, or executed some programs that generated data). In another variant the remote server generates and downloads the same files that are downloaded on the local user computer devices. For example, if a person begins to download a program, the server may also download the same program on a remote backup server. This way, if the user loses this program, it can be retrieved automatically through a provided server on the Internet. If user's files are backed up by regular backup periodically, relevant data that were stored by real time backup servers can be eliminated.

6 Claims, 10 Drawing Sheets

Related U.S. Application Data continuation of application No. 10/768,795, filed on Jan. 30, 2004, now Pat. No. 7,499,957, which is a division of application No. 09/564,617, filed on May 4, 2000, now Pat. No. 6,711,699.

(51) Int. Cl.
*G06F 11/14* (2006.01)
*G06F 11/34* (2006.01)

(56) References Cited

U.S. PATENT DOCUMENTS

| | | | |
|---|---|---|---|
| 5,321,608 A * | 6/1994 | Namba et al. | 704/9 |
| 5,526,465 A | 6/1996 | Carey et al. | |
| 5,553,119 A | 9/1996 | McAllister et al. | |
| 5,586,254 A | 12/1996 | Kondo et al. | |
| 5,604,862 A * | 2/1997 | Midgely et al. | 714/6.1 |
| 5,642,505 A * | 6/1997 | Fushimi | |
| 5,687,254 A | 11/1997 | Poon et al. | |
| 5,761,329 A | 6/1998 | Chen et al. | |
| 5,787,187 A | 7/1998 | Bouchard et al. | |
| 5,794,563 A | 8/1998 | Klepac | |
| 5,799,147 A | 8/1998 | Shannon | |
| 5,825,921 A | 10/1998 | Dulong | |
| 5,829,046 A | 10/1998 | Tzelnic et al. | |
| 5,832,211 A | 11/1998 | Blakley, III et al. | |
| 5,838,306 A | 11/1998 | O'Connor et al. | |
| 5,933,653 A | 8/1999 | Ofek | |
| 5,968,138 A | 10/1999 | Clough | |
| 5,974,563 A | 10/1999 | Beeler, Jr. | |
| 6,006,175 A | 12/1999 | Holzrichter | |
| 6,058,494 A | 5/2000 | Gold et al. | |
| 6,101,264 A | 8/2000 | Wagner et al. | |
| 6,163,616 A | 12/2000 | Feldman | |
| 6,249,606 B1 * | 6/2001 | Kiraly et al. | 382/195 |
| 6,249,765 B1 | 6/2001 | Adler et al. | |
| 6,295,051 B1 | 9/2001 | Kanevsky et al. | |
| 6,421,453 B1 | 7/2002 | Kanevsky et al. | |
| 6,438,545 B1 | 8/2002 | Beauregard et al. | |
| 6,553,345 B1 | 4/2003 | Kuhn et al. | |
| 2001/0054020 A1 * | 12/2001 | Barth et al. | 705/37 |
| 2002/0156774 A1 | 10/2002 | Beauregard et al. | |
| 2002/0175955 A1 * | 11/2002 | Gourdol et al. | 345/821 |

\* cited by examiner

DATABASE OF USER ACTIONS

| 200 | 201 | 202 | 203 | 204 | 205 | 206 |
|---|---|---|---|---|---|---|
| Time start and time alignment | Device | Media | User | Place | Environment | Correlation |
| 10:00 | Laptop | Voice Keyboard Mouse | Laurel | Office | Dark Room | Index |
|  | TV |  |  |  |  |  |
|  | Recorder | Voice | - | - | - |  |
|  | Telephone | Voice Keyboard |  | Car | Car Noise |  |
|  | Controller |  |  |  |  |  |
|  | Desktop |  |  |  |  |  |
|  | Watches |  |  |  |  |  |
|  | Palm Top |  |  |  |  |  |

Figure 2

| 401 | 402 | 403 | 404 | 405 | 406 | 407 | 408 | 409 |
|---|---|---|---|---|---|---|---|---|
| Data Types | Users | Time Generation | Devices Program | Media | Arguments | References E-Mails | Location | Remove Condit |
| New | Name 1 | +1 | Recorder | Voice | | www.name.com | web | |
| Changes | Name 2 | +2 | Word Processor | Typing | | | | |
| Links | Name 3 | +3 | Smart Phone | | arg 1 arg 2 | | local pc | |
| Programs Generating Data | Name 4 | +4 | Gestures | | | | | |

Figure 4

| 500 | 501 | 502 | 503 | 504 | 505 | 506 | 507 |
|---|---|---|---|---|---|---|---|
| Index | Programs | Users | Time/History | List of Arguments | OS | Devices | Source |
| Location of data | Signal Processing | Name 1 | $t_1, t_2, t_3$ | $L_1, L_2, L_3$ | AIX | RISCG000 | Voice |
| | Prime Generator | Name 2 | $t_4$ | L | WIN | Calculate | Keyboard |
| | Vitual Maker | Name 3 | $t_5$ | L | NT | PC | Text |
| | | | | | | | |

Figure 5

| 601 Input | 602 Class | 603 Count | 604 Tree Index | 605 Index to Files |
|---|---|---|---|---|
| Action 1 | Act 1 | U1 | Acts→Act 4→<br>→Act 2→ | |
| Action 2 | Act 2 | U2 | | |
| Action 3 | Act 3 | U3 | | |

Figure 6

REAL TIME BACKUP SYSTEM FOR COMPUTER USERS

RELATED APPLICATIONS

This application is a continuation application of U.S. Ser. No. 13/085,106, filed Apr. 12, 2011, which is a divisional application of U.S. Ser. No. 12/124,750, filed May 21, 2008, now U.S. Pat. No. 7,991,739, which is a continuation application of application Ser. No. 10/768,795, filed Jan. 30, 2004, now U.S. Pat. No. 7,499,957, which is a divisional application of U.S. Ser. No. 09/564,617, filed May 4, 2000, now U.S. Pat. No. 6,711,699.

BACKGROUND OF THE INVENTION

1. Field of the Invention

The present invention relates generally to real time computer backup systems, and, more specifically, to a mechanism for recording and interpreting user actions (including user gestures) for real time backup.

2. Discussion of the Prior Art

Users of personal computers often experience problems when attempting to save data, for example, to a computer hard drive or floppy disk. Sources of problems include downloading of viruses, power outages, and making simple mistakes, which often result in the loss of important information. There are backup systems that function to help prevent some of these problems.

A first backup system, described at http://www.systemrestore.com/NetMass and available from SystemSafe™, is an automated online backup and real-time recovery solution through a server that provides typical users with the same data management benefits as are available to the largest corporations. These benefits include compression, sophisticated encryption, network deployment, hands-off operation, IT policy/management, and offsite storage. Designed specifically to support desktop and laptop computers, the SystemSafe recovery system automatically backs up computer systems via a network connection to the NetMass data center. Simply put, the SystemSafe system automatically compresses, securely encrypts, and then transmits a user's data to off-site storage locations on a user defined schedule. While this system is a very effective backup system, it cannot work if the user is not connected to the Internet, or it the user's modem is not working.

A second system, LiveVault, which is similar to the first system, uses real time to backup information immediately and constantly. Unlike conventional batch backup products, LiveVault backs up changes to data in real time. The technology integrates byte-level replication with an intelligent self-managing storage archive. Byte-level replication provides a low load on both the communications services and the production servers, while keeping current data fully protected. This enables, for the first time, server backup over lower cost, lower speed communications lines. The automated multi-tier online storage system eliminates the need for repeated full backups by synthesizing full backups without placing additional demands on the communications network.

A problem with this second system is that if the user terminates his/her connection, all information that was being backed is immediately lost.

A third system, available through Double-Take and described at http://www.nsisw.com/pages/dtakewin.htm, is similar to both the first and second systems discussed above. Double-Take, however, backs up only the most current files in a computer and not entire files where only one small change may have occurred. After the initial synchronization of files, Double-Take's real-time data replication transmits only the byte-level changes, thus using the smallest amount of network bandwidth possible. Other technologies may need to transmit an entire disk block or may retransmit the whole file regardless of how much or how little data actually changed. This provides the best possible protection at the lowest cost.

While this third system is the most effective of the three, it is still vulnerable to a modem break down.

Other problems that occur with these back up systems is that they do not back up embedded devices that are not connected to the Internet, such as a clock, watch, television, and a radio. Additionally, having a constant and immediate connection with servers may make the process very slow and cause many problems.

It is highly desirable to provide a system for tracking and backing all information that a user generates on computer devices (including embedded devices) in real time.

It is further highly desirable to provide a real-time backup system that tracks user generated information, including user actions and saved files in a computer, and sends the information to a remote server via the Internet.

SUMMARY OF THE INVENTION

It is an object of the present invention to provide a system for tracking and backing all information that a user generates on the user's computer devices (including embedded devices) in real time.

Another object of this invention is to provide a real-time backup system that tracks user generated information, including user actions and saved files in a computer, and sends the information to a remote server via the Internet.

The present invention relates to tracking and backing all the information that a user generates, including user actions and saved files in a computer, on the user's computer devices (including embedded devices) in real time. A server records user actions and gestures (via various devices such as TV cameras) and transmits all of this information to a remote server via the Internet. This remote server includes a virtual map of all the embedded devices on a computer that the person uses. The server immediately starts to interpret the user's actions (including user gestures) that are tracked, monitored and recorded by television cameras to record user gestures.

In one implementation, the invention stores user actions that are related to data generation (e.g. actions that called some links where data is stored, or executed some programs that generated data). In another variant, the remote server generates and downloads the same files that are downloaded on the local user computer devices. For example, if a person begins to download a program, the server may also download the same program on a remote backup server. This way, if the user loses this program, the program can be retrieved automatically through the provided server on the Internet. If user's files are backed up by regular backup periodically, relevant data that were stored by real time backup servers may be eliminated.

BRIEF DESCRIPTION OF THE DRAWINGS

Further features, aspects and advantages of the apparatus and methods of the present invention will become better understood with regard to the following description, appended claims, and accompanying drawings where:

FIG. 2 shows how a data base of user actions is organized.

FIG. 4 generally illustrates the manner in which data is stored in the backup server from FIG. 3.

FIG. 5 continues the explanation of the database of programs shown in FIG. 1.

FIG. 6 is an explanation of the history of user actions.

DETAILED DESCRIPTION OF THE PREFERRED EMBODIMENTS OF THE INVENTION

Figure 1:
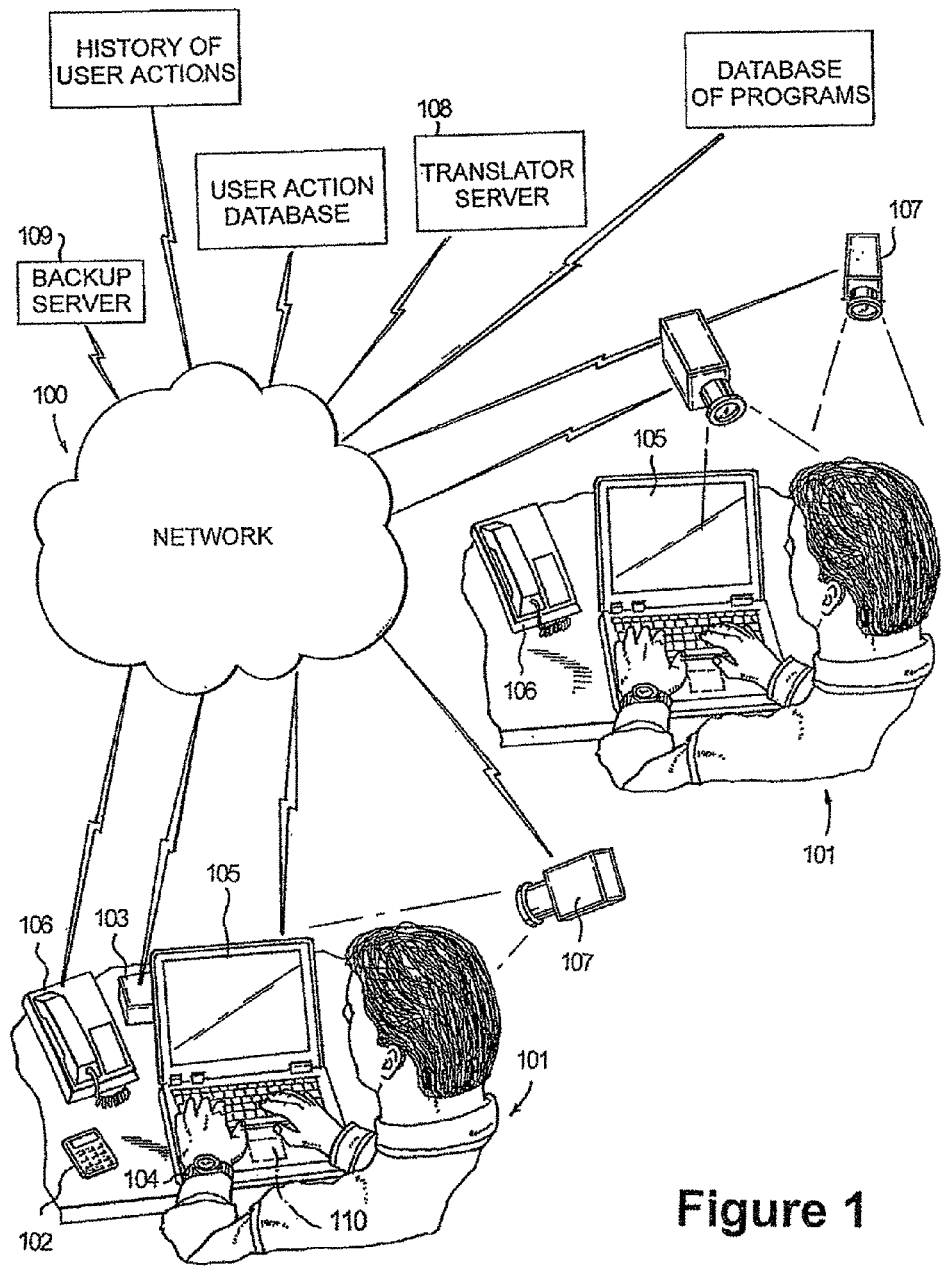
FIG. 1 illustrates a general picture for a backup server.

FIG. 1 shows a general picture for a backup server. In this Figure, the reference number 100 represents the network. The user 101 is using many devices such as a telephone 106, a computer 105, a watch 104, a recorder 103, and a calculator 102. User 101 performs various actions on the devices around him. These actions are recorded by a video camera 107, and by a processor 110 that is running in the computer 105. Other embedded devices may also contain this processor 110 that records a user's actions. Some items are connected to the network, such as the computer 105, or the telephone 106. Other devices, such as the watch, 104, or calculator 102, are not connected to the network.

A similar description can be seen for another user 101 at a different location. This user also has several video cameras 107, and a computer 105. Video cameras surround the user and his/her devices in more than one area to provide a maximum back up for all the user's devices. The video cameras can have more than one use. They can be used as forms of security and as ways to help provide information for backup. A user's actions are stored in a database 106 of user actions. A user's actions are interpreted by a translator server 108. The translator interprets which actions made by the user actually change the database. This information is sent to a backup server 109, where it is decided what should be saved and what actions should be performed. Any suitable gesture recognition procedure, for example, is disclosed in copending application Ser. No. 09/079,754 for "Apparatus and Method For User Recognition Employing Behavioral Passwords," filed May 15, 1998, the disclosure of which is herein incorporated by reference.

The backup server 109 also downloads files that were downloaded by the user. In some cases, a user may generate new data by using a program, for example if the user was using a program that generates new prime numbers, the translator of the user's action would understand that in order to obtain certain data, the translator needs executables. The translator may require that some executables need to be downloaded in order for the server to be able to keep up with the user's actions. For instance, if the user has a program that can generate new data, the server would download the same program and enter the same commands as the user did. This saves time because it reduces the time spent on having to copy and save data.

FIG. 2 shows how the data base of user actions is organized. The start and finish of the time alignment is recorded under column 200. Column 201 contains the list of devices that user actions were performed on. For example, a laptop, television, recorder, telephone, controller, desktop, watches, and a palmtop. The form of media used to control these devices is located under column 202. For example, if a person used their voice to activate a device, that would be listed. Changes in the devices are recorded under correlation column 206. Column 203 gives the names of users for each device. Column 204 lists the location of each device, and column 205 lists the environment of each place.

Figure 3:
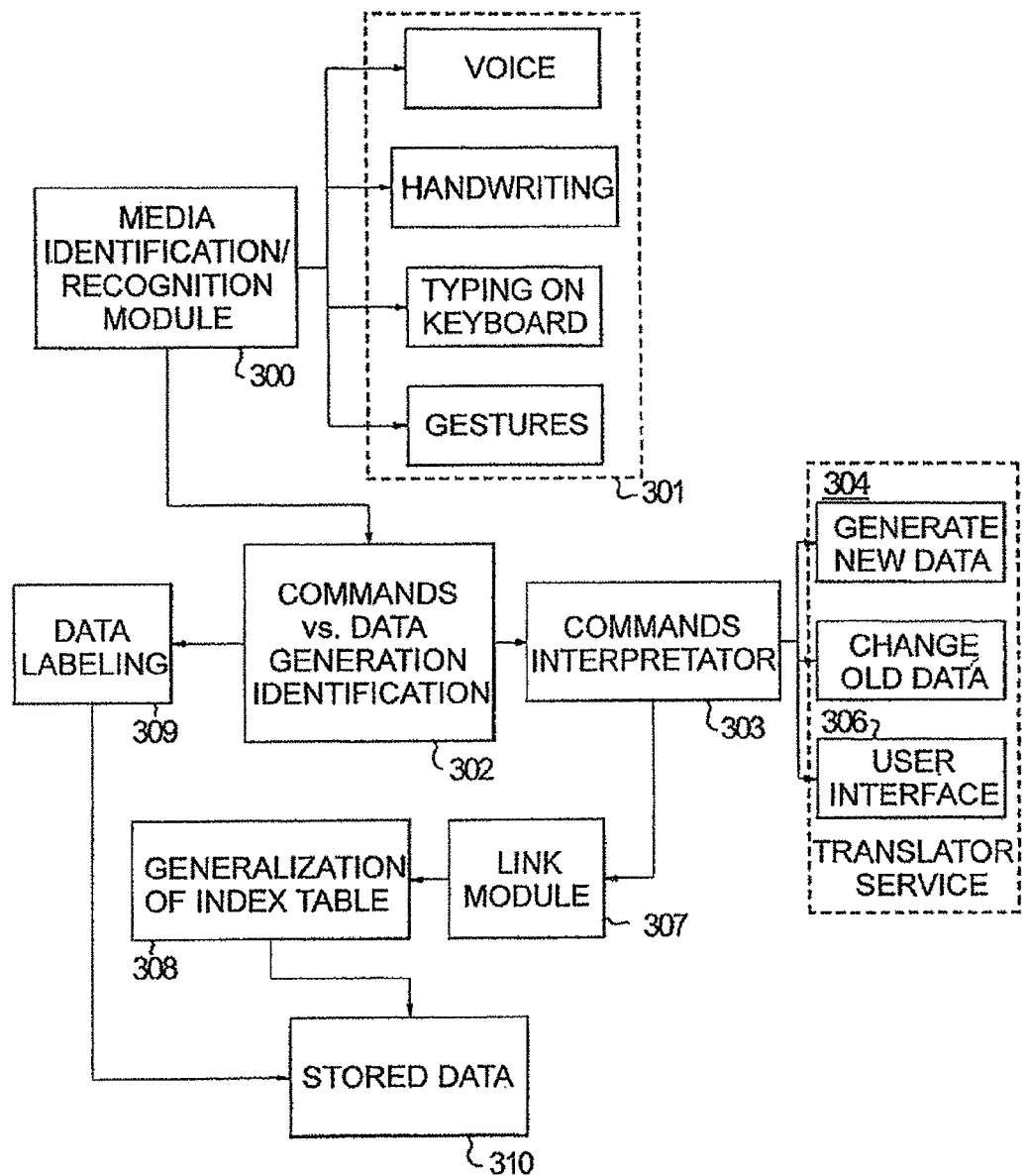
FIG. 3 shows how a media identifier module works.

FIG. 3 shows how the media identifier module works. The reference number 300 represents the media identifier module. The media identifier module interprets what form of media a person used to perform a function. A user could function a program in many ways, such as by using voice, a gesture, or typing 301. Module 302 is responsible for being able to tell the difference between a command or a data generation identification. After the data is sent through module 302, the data are sent to module 303 where the commands are interpreted. These commands could be commands such as commands to generate new data 304, change old data, or a user interface 306. If the data is identified as data that generates new data, the data are labeled in module 309. The data labeler labels data according to whether they have a link or not. If the data has a link, the data is processed as a link data. Link module 307 connects commands with data. For example, if certain data were found using a link, the link module would show this. Module 308 lists the addresses of the links that need to be used to get data 310, storing data in backup, is described below.

FIG. 4 provides a description of how data are stored in the backup server from FIG. 3. Column 401 shows the types of data. This includes new data, old data, links to data, and programs that generate data. Column 402 lists the names of the user's who created the data using programs. Column 403 shows the time all the data was generated. This also includes when the data had been changed or when the data were connected to links Column 404 lists all the commands used to create new data. This is important for backup because this is used to restore files and data. Column 405 shows the types of media used to operate a program. Media includes voice, gestures, typing, etc. Column 407 lists the links to websites where data were obtained, so data could be obtained through the website instead of the user to save time. Column 408 lists locations and column 409 lists remove conditions.

FIG. 5 continue the explanation of the database of programs, which was described above in connection with FIG. 1. Column 501 lists the programs used, such as signal processing, prime processing, and an html maker Column 502 lists the name of the users for each program. Column 503 is responsible for keeping track of the time for generation of data and changes. This column is also responsible for keeping track of data history. Column 504 lists commands used to control programs. This is important because it helps restore data. Column 505 (operating system) shows what operating system holds data. Column 506 shows the devices that were being used by programs. Column 507 lists the sources that were used to obtain data, such as voice, keyboard, or text. Column 500 is an index which shows where data are to be stored.

FIG. 6 shows a database that gives and explanation of the history of user actions. Column 601 records the actions that are inputted to control a program. Each action fits under a designated class. For example, if two actions (say, action 1) can cause the same program to do the same thing (e.g. open same file?), then put these actions in the same class, act 1. Similarly, some other actions are put in the same class, like act 2, act 3, etc. This is shown in column 602. This will also be discussed in connection with another Figure. Column 603 is in charge of keeping a count of how often a class is formed by similar actions. It should be noted that actions do not stay in the input column 601 for a long period of time. If these actions fall into a class, the actions are automatically withdrawn from the input column. Column 604 creates a tree of the order of actions that took place when a program was being used. For example, if a program was opened by saying a command, this would become the start of the tree. Then, when the programmed new action took place, this would be put in the tree in accordance to the first action. Column 605 is in charge of placing an index to a file from the tree index 604. For example, the actions change data so the index shows the files from after the latest change.

Figure 7:
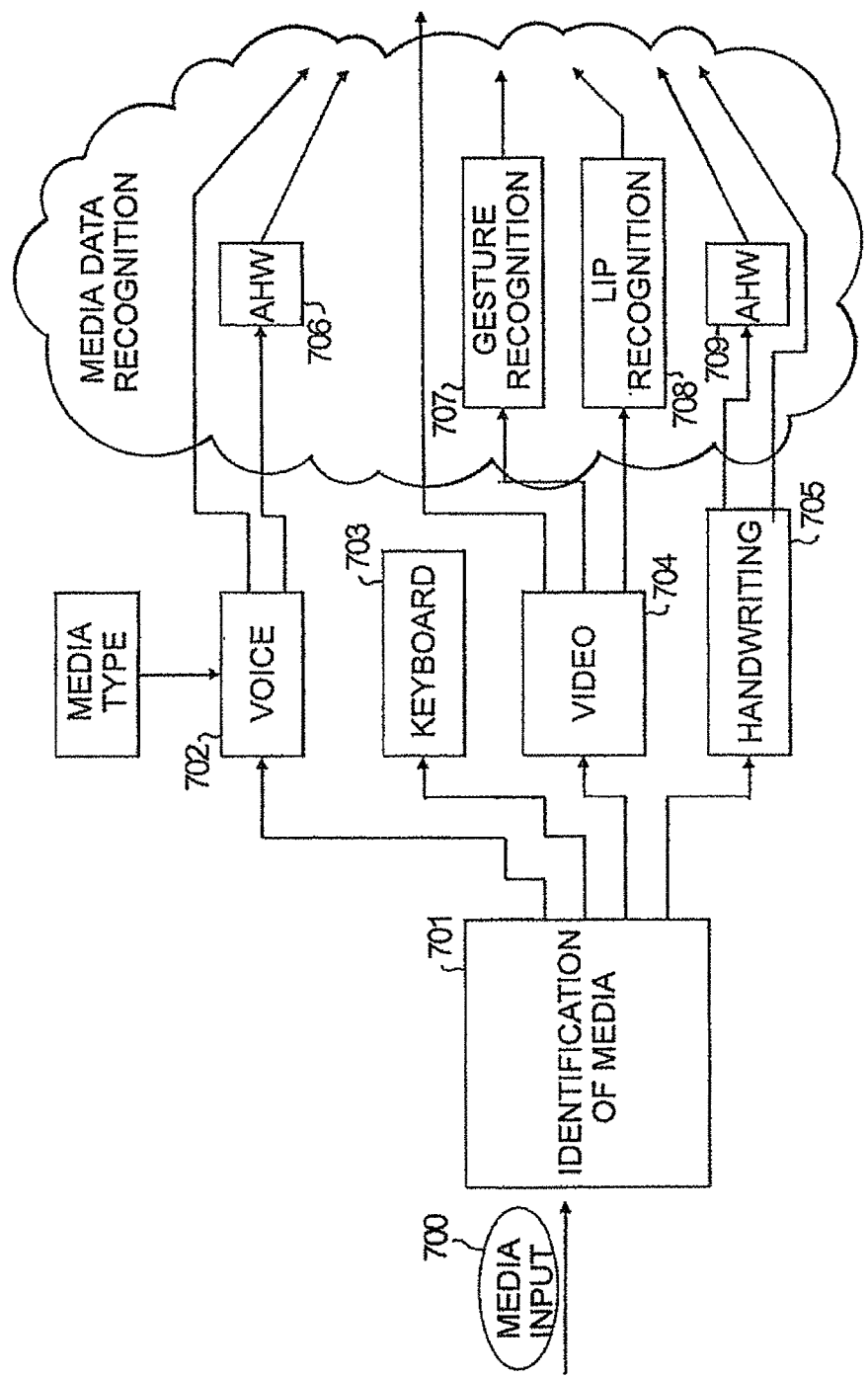
FIG. 7 describes a media identifier recognition module.

FIG. 7 describes the media identifier recognition module. The reference number 700 represents some form of media input, gestures, speaking, typing, etc., and the reference number 701 identifies the type of media used. This is done by telling where the data came from. For example, if the data are created by the user of a key board, the data are called keyboard input 703, but if the data are created by the use of a microphone, the data are called voice input 702. Also, if the data are created using a video camera, the data are called video input 704, and hand written data are called written input 705. The next module is the media data recognition. Voice 702 is recognized by Automatic speech recognition system 706. The video 704 is recognized by gesture recognition 707, or lip reading recognition 708. Finally, handwriting 705 is recognized by the automatic hand writing system 709.

Figure 8:
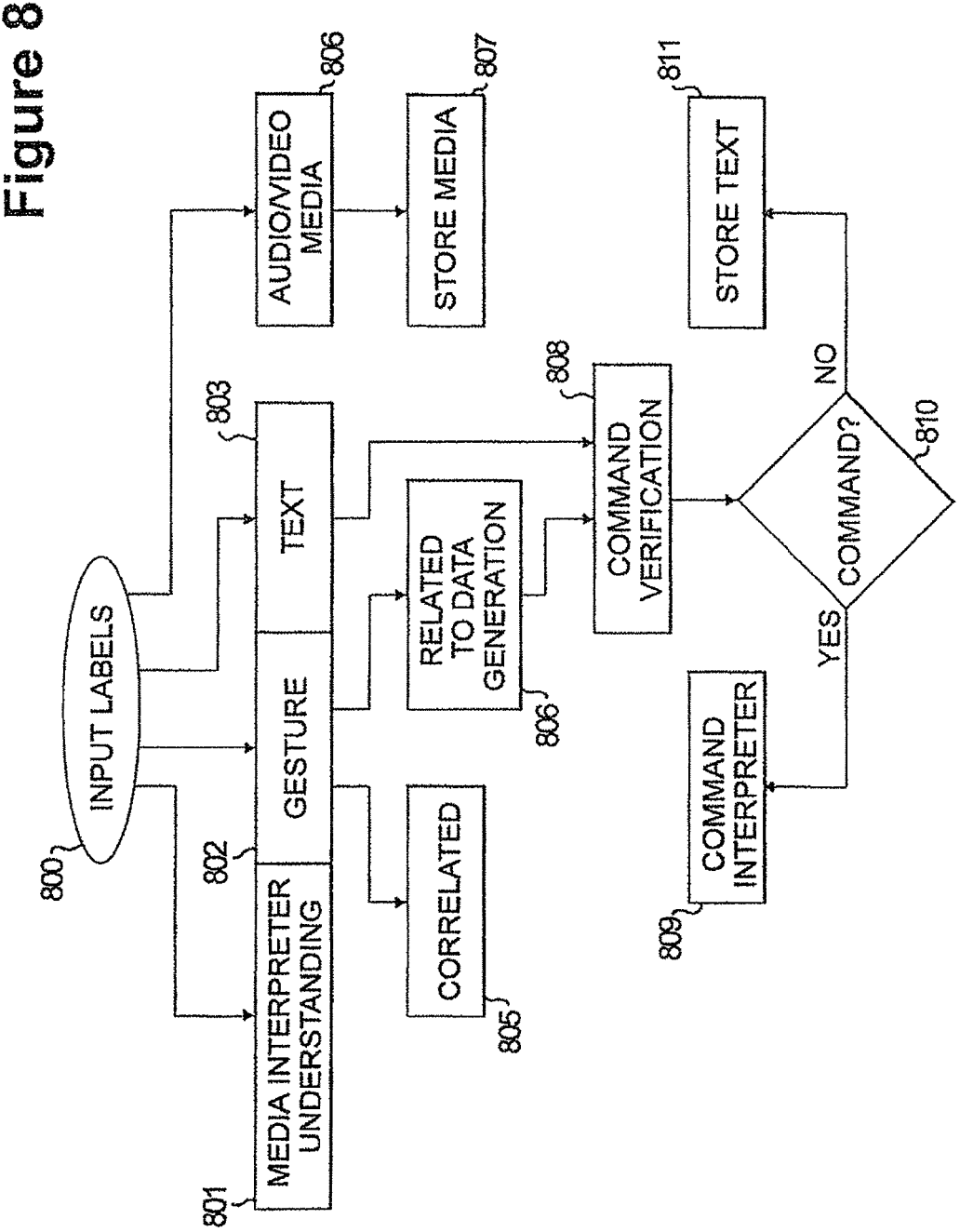
FIG. 8 illustrates command vs. data generation identification.

FIG. 8 explains command vs. data generation identification. Procedure 800 receives input labels that were processed in FIG. 7. Element represented at 801 is in charge of interpreting the media used by the user. Reference number 802 represents gesture, 803 text, and 804 audio/video, represent the form of media that the data are in when the data are received into the backup server. The data that are gesture generated are then determined to be related or unrelated to data generation. This is represented at 805 and 806. Text must be verified to be a command or not, so the text is sent through a command verifier 808, and then it is determined if the text is a command or not. At 810, the data are separated from the data that is a command and the data that is not. If the data is a command, it is interpreted 809, but if the data is not a command, it is stored 811. Audio/Video data is stored in a media file 807.

Figure 9:
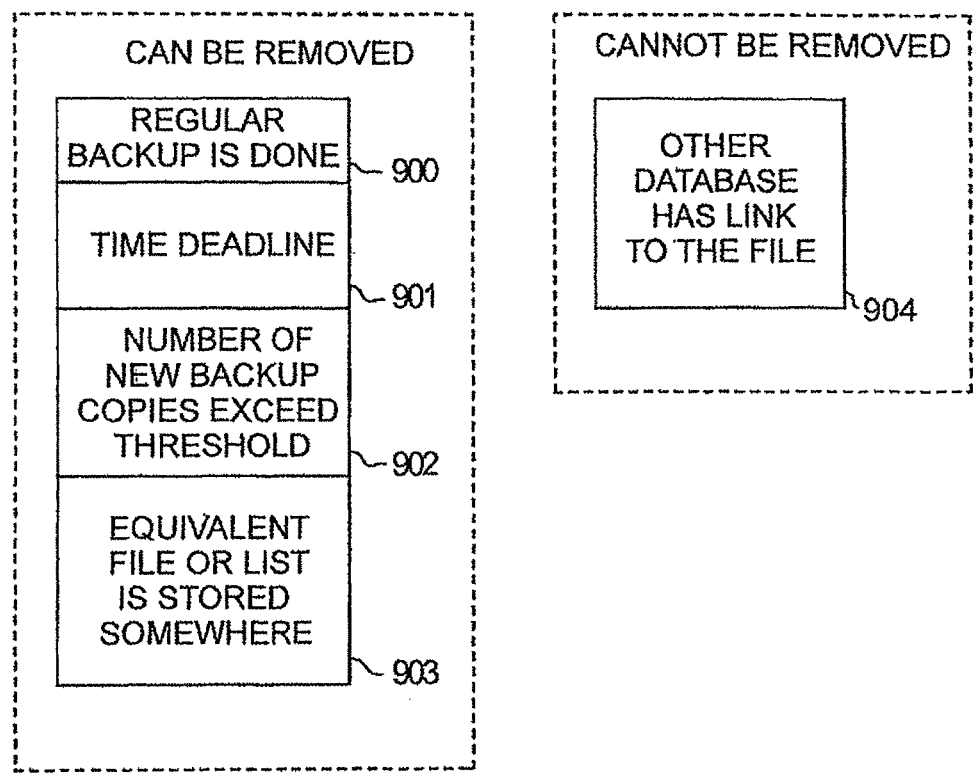
FIG. 9 shows remove conditions for the real-time back up system.

FIG. 9 shows what the remove conditions are for the real-time back up system. Module 900 shows that a regular back up is performed. This could be done weekly. This data can be removed. It is decided whether data should be removed or not by the following circumstances: how old it is, if there are newer versions of this data, and how often it is being used. This is decided by the time deadline module 901. Step 902 determines the number of new backup copies that exceed the threshold. For example, if a new version of an old program has been released and downloaded, the older version would be deleted. At step 903, the equivalent file or link is stored somewhere. The only condition where a file cannot be removed is shown in 904, where another database has link to a file that another database needs.

Figure 10:
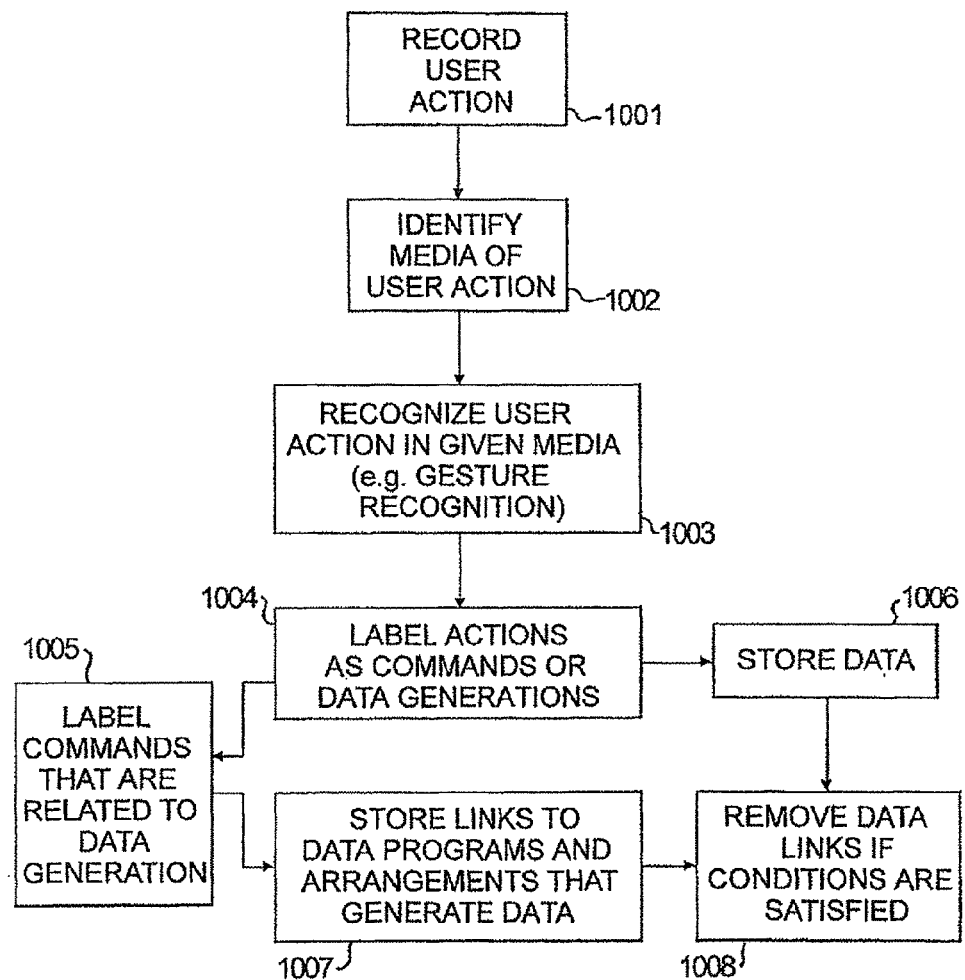
FIG. 10 is a flowchart of the method of real-time backup.

FIG. 10 is a flowchart of the method of real-time backup. First, the method, at step 1001, records a user's actions. Then the actions are identified at step 1002. Then, the user actions are interpreted in a user media recognizer 1004, labeling of actions as commands or data generators take place. Step 1005 labels commands that are related to data generation. At step 1006, the data from 1004 is then stored. Step 1007 stores the links to data programs and commands that generate data. Step 1008 is where data and links are removed if the conditions are satisfied.

While the invention has been particularly shown and described with respect to illustrative and preformed embodiments thereof, it will be understood by those skilled in the art that the foregoing and other changes in form and detail may be made therein without departing from the spirit and scope of the invention which should be limited only by the scope of the appended claims.

The invention claimed is:

1. A method for operating a real-time data back up system, comprising:

performing a regular back up of defined data used by a user in a computer system by storing the defined data in a backup server, wherein at least some of the data were obtained by the user by using actions to call links to a plurality of websites wherein said actions include commands and data generation;

distinguishing between the commands and the data generation, including labeling each of the actions as being one of a plurality of media types including gesture and text; sending the text actions through a command verifier to determine if the texts are command; and determining whether the gesture actions are related or unrelated to data generation;

storing said actions by the user and the links to said plurality of websites;

the back up server using said actions to call the links to the websites to obtain additional data for the back up server through the websites instead of the user to save time; and determining whether data should be removed or not from the backup server by the following circumstances: how old the data are, if there are newer versions of this data, and how often the data are being used; and wherein the only condition where a file cannot be removed is where another database has a link to a file that another database needs.

2. A method of establishing a database of programs and using said programs in a computer backup system for backing up data used by a group of users, the method comprising:

listing in a first column the programs used; listing in a second column the names of the users for each program; using a third column for keeping track of the time for generation of data and changes; also using the third column for keeping track of data history; listing in a fourth column commands used to control the programs; listing in a fifth column the operating system used to hold data; listing in a sixth column the devices that were used by the programs; listing in a seventh column the sources that were used to obtain data; using an eighth column as an index showing where data is to be stored;

distinguishing between the commands and the data generation, including labeling each of the actions as being one of a plurality of media types including gesture and text; sending the text actions through a command verifier to determine if the texts are command; and determining whether the gesture actions are related or unrelated to data generation;

one or more of the users entering one or more of the commands listed in the fourth column to use one or more of the programs listed in the first column to obtain files and data and a backup server entering said one or more of the commands listed in the fourth column to use the one or more programs listed in the first column to restore said files and data in the backup server.

3. A method of using a database to explain the history of user's actions performed to generate data, the method comprising:

using a first column to records the actions that are inputted to control a program by a user to cause the program to perform specified functions to generate specified data, wherein each of the actions fits under a designated class based on the specified function said each of the actions causes the program to perform wherein said actions include commands and data generation; distinguishing between the commands and the data generation, including labeling each of the actions as being one of a plurality of media types including gesture and text; sending the text actions through a command verifier to determine if the texts are command; and determining whether the gesture actions are related or unrelated to data generation;

showing in a second column the class in which each action is placed;

using a third column to keep a count of how often a class is formed by similar actions; if one or more of the actions fall into a one of the classes in the second column, automatically withdrawing said one or more of the actions from the input column;

using a fourth column to show a tree of the order a group of the actions that took place when the program was being used;

using a fifth column for placing an index to a file from the tree index; and a backup server using said tree to generate data and storing in the file indexed from the tree the data generated from using said tree.

4. A method of operating a real-time data backup system, comprising:

recording a user's actions wherein said actions include commands and data generation;

identifying the actions;

interpreting the user actions in a user media recognizer;

distinguishing between the commands and the data generation, including labeling each of the actions as being one of a plurality of media types including gesture and text; sending the text actions through a command verifier to determine if the texts are command; and determining whether the gesture actions are related or unrelated to data generation;

labeling the commands that are related to data generation;

storing data in a backup server;

storing links to data programs and the commands that generate data;

when one of the users uses a plurality of the commands to obtain defined data using one of the data programs, the backup server using the links to the data programs and the commands to obtain the same data obtained by said one of the users; and removing the data and the links if predefined conditions are satisfied.

5. A program storage device readable by machine, tangibly embodying a program of instructions executable by the machine to perform a method for operating a real-time data backup system, the method comprising:

recording a user's actions wherein said actions include commands and data generation; identifying the actions; interpreting the user actions in a user media recognizer;

distinguishing between the commands and the data generation, including labeling each of the actions as being one of a plurality of media types including gesture and text; sending the text actions through a command verifier to determine if the texts are command; and determining whether the gesture actions are related or unrelated to data generation;

labeling the commands that are related to data generation; storing data in a backup server; storing links to data programs and the commands that generate data;

when one of the users uses a plurality of the commands to obtain defined data using one of the data programs, the backup server using the links to the data programs and the commands to obtain the same data obtained by said one of the users; and removing the data and the links if predefined conditions are satisfied.

6. A program storage device according to claim 5, wherein:

the removing step includes the step of determining whether data should be removed or not by the following circumstances: how old the data are, if there are newer versions of this data, and how often the data are being used; and the only condition where a file cannot be removed is where another database has a link to a file that another database needs.

* * * * *